United States Patent
Raymond et al.

(10) Patent No.: US 10,855,186 B2
(45) Date of Patent: Dec. 1, 2020

(54) ISOLATED MULTI-LEVEL RESONANT TOPOLOGIES FOR WIDE-RANGE POWER CONVERSION AND IMPEDANCE MATCHING

(71) Applicant: The Board of Trustees of the Leland Stanford Junior University, Stanford, CA (US)

(72) Inventors: Luke C. Raymond, Redwood City, CA (US); Wei Liang, Stanford, CA (US); Juan M. Rivas Davila, Palo Alto, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 0 days.

(21) Appl. No.: 16/272,393

(22) Filed: Feb. 11, 2019

(65) Prior Publication Data
US 2019/0334441 A1    Oct. 31, 2019

Related U.S. Application Data

(63) Continuation of application No. 15/199,326, filed on Jun. 30, 2016, now Pat. No. 10,218,276.
(Continued)

(51) Int. Cl.
*H02M 3/00* (2006.01)
*H02M 3/28* (2006.01)
(Continued)

(52) U.S. Cl.
CPC .......... *H02M 3/28* (2013.01); *H02M 3/33523* (2013.01); *H02M 7/08* (2013.01);
(Continued)

(58) Field of Classification Search
CPC ... H02M 2001/007; H02M 2001/0074; H02M 2001/0077; H02M 2001/0058;
(Continued)

(56) References Cited

U.S. PATENT DOCUMENTS 4,449,174 A * 5/1984 Ziesse .................. H02M 3/155
                                                                 323/222
5,396,165 A * 3/1995 Hwang .................... G05F 1/70
                                                                 323/210
(Continued)

FOREIGN PATENT DOCUMENTS

CN          101951159 A      4/2013
WO      WO 2010069620 A1    6/2010
(Continued)

OTHER PUBLICATIONS

Glaser, et al., "A 900W, 300V to 50V Dc-dc Power Converter with a 30 MHz Switching Frequency," 2009, IEEE 24th Applied Power Electronics Conference, pp. 1121-1128.

*Primary Examiner* — Harry R Behm
(74) *Attorney, Agent, or Firm* — Crawford Maunu PLLC

(57) ABSTRACT

Resonant power converters that replace the conventional impedance matching stage with series or parallel connections between resonant inverters and resonant rectifiers are provided. Two or more resonant rectifiers can be connected in series or in parallel to the resonant inverter to provide impedance matching. Similarly, two or more resonant inverters can be connected in series or in parallel to the resonant rectifier to provide impedance matching. Electrical isolation of DC voltage between input and output is provided using only capacitors.

20 Claims, 12 Drawing Sheets

Related U.S. Application Data

(60) Provisional application No. 62/190,915, filed on Jul. 10, 2015.

(51) Int. Cl.
*H02M 3/335* (2006.01)
*H02M 1/00* (2006.01)
*H02M 7/08* (2006.01)
*H02M 7/10* (2006.01)

(52) U.S. Cl.
CPC ...... *H02M 7/10* (2013.01); *H02M 2001/0058* (2013.01); *H02M 2001/0074* (2013.01); *H02M 2001/0077* (2013.01); *Y02B 70/1491* (2013.01)

(58) Field of Classification Search
CPC ..... H02M 2001/0048; H02M 3/33523; H02M 7/08; H02M 7/10
See application file for complete search history.

(56) References Cited

U.S. PATENT DOCUMENTS

| | | |
|---|---|---|
| 5,583,421 A | 12/1996 | Barbehenn et al. |
| 7,576,611 B2 * | 8/2009 | Glaser ............... H03F 3/195 |
| | | 330/125 |
| 7,889,519 B2 | 2/2011 | Perreault et al. |
| 9,515,560 B1 * | 12/2016 | Telefus ............... H02M 3/158 |
| 2007/0253225 A1 * | 11/2007 | Baurle ............... H02M 3/07 |
| | | 363/16 |
| 2012/0069606 A1 * | 3/2012 | Sagneri ............... H02M 3/158 |
| | | 363/21.02 |
| 2014/0346962 A1 * | 11/2014 | Sanders ............... H02M 1/4208 |
| | | 315/193 |
| 2015/0098252 A1 * | 4/2015 | Spinella ............... H02J 50/12 |
| | | 363/21.01 |
| 2015/0303806 A1 | 10/2015 | Madsen et al. |
| 2017/0085189 A1 | 2/2017 | Madsen |
| 2018/0175741 A1 * | 6/2018 | Andersen ........... H02M 3/1584 |

FOREIGN PATENT DOCUMENTS

| | | | | |
|---|---|---|---|---|
| WO | WO-2016202895 A1 * | 12/2016 | | H03M 3/155 |
| WO | WO 2016202895 A1 | 12/2016 | | |

* cited by examiner

ISOLATED MULTI-LEVEL RESONANT TOPOLOGIES FOR WIDE-RANGE POWER CONVERSION AND IMPEDANCE MATCHING

CROSS REFERENCE TO RELATED APPLICATIONS

This application claims the benefit of U.S. provisional patent application 62/190,915, filed on Jul. 10, 2015, and hereby incorporated by reference in its entirety.

FIELD OF THE INVENTION

This invention relates to electric power converters.

BACKGROUND

One byproduct of the ever increasing market for portable electronics has been low and moderate voltage power converters with relatively high efficiency and power density. For example, switching power converters found in laptop and cell phone supplies tend to have power densities of 10s of watts/in$^3$, and high end DC-DC converters can have power densities in the 100s of watts/in$^3$. High voltage power supplies (600 v and up) on the other hand are state of the art if they have over 10 watts/in$^3$ and the status quo tends to be between 1 and 5 watts/in$^3$. High voltage power supplies also tend to use circuit topologies that are inherently inefficient. Accordingly, it would be an advance in the art to provide improved DC-DC power converters.

SUMMARY

By implementing circuit topologies described herein we are able to increase power density over existing high voltage supplies by an order of magnitude while maintaining higher efficiencies. Furthermore, as resonant topologies lend themselves to switching frequencies in the 10s or even 100s of MHz, the transient response of the designs described in this work allow them to provide very short pulses of high voltage energy. The combined benefits of fast transient response, high efficiency, and significant size reduction allow these power supplies to be an enabling technology in high end fields including aeronautics, space and medical.

More specifically, an exemplary embodiment of the invention is a DC to DC electric power converter that includes: 1) a resonant power inverter configured to receive a DC input and to provide an AC output having a frequency $f_{out}$, where the output impedance of the power inverter is $Z_{out}$; and 2) two or more resonant rectifier circuits directly connected to the AC output provided by the power inverter, where the resonant rectifier circuits are operating resonantly at $f_{out}$, and where the resonant rectifier circuits are each configured to receive the AC output and to provide a DC output. Electrical isolation between the DC input and the DC outputs is provided exclusively with capacitors. Alternatively, two or more resonant power inverters can be connected to a single resonant rectifier for impedance matching purposes.

Impedance matching is provided by parallel connections between the resonant rectifier circuit(s) and the power inverter(s). For example, if each of N resonant rectifier circuits has an input impedance of $Z_{in}$, impedance matching is provided if $Z_{in}$ is about $NZ_{out}$. If resonant rectifier stages having unequal impedances are employed, then impedance matching is provided if $Z_{out}$ is about equal to the equivalent impedance $Z_{eq}$. As is well known in the art, $Z_{eq}$ for a parallel combination of impedances $Z_1$, $Z_2$, $Z_3$, etc. is given by $1/Z_{eq}=1/Z_1+1/Z_2+1/Z_3+\ldots$. In either case, the impedance matching need not be exact, but it is preferred that the impedance matching be accurate to within about 20%.

Potential applications of this work include, but are not limited to: pulsed electric field (PEF) sterilization, X-ray sources, high voltage sources, plasma applications such as internal combustion engine ignition, medical applications such as ozone plasma generation, scientific instruments, space applications such as satellite plasma drivers, and multilevel converters or inverters.

Pulsed Electric Field (PEF) pasteurization is a method of sterilizing liquid that is significantly more energy efficient than thermal methods. So far, PEF has only found limited application due to the large initial capital costs and the large size of available systems. By applying the power supply strategy described in this work, a PEF unit can be realized in a portable package similar in size to a Brita® filter. The low cost associated with such a design can make this technology accessible to a wider market that may also include developing countries, and using only a small fraction of the energy requirement of the conventional pasteurization method. A small PEF unit may be solar powered making it available for other uses like milk pasteurization and even water purification in remote areas, bringing further benefits to the community.

DETAILED DESCRIPTION

While significant progress has been made on switch-mode power supplies in terms of size and efficiency to date, the focus has primarily been on relatively low voltage and/or low gain applications. Performance of large conversion power converters, either for high voltage and high gain step-up converters or step-down converters has lagged on many metrics including power density, efficiency, transient response, and cost. This work provides new circuit topologies that provide high efficiency and high power density in very high frequency converters when large voltage conversion ratios are needed.

Figure 1:
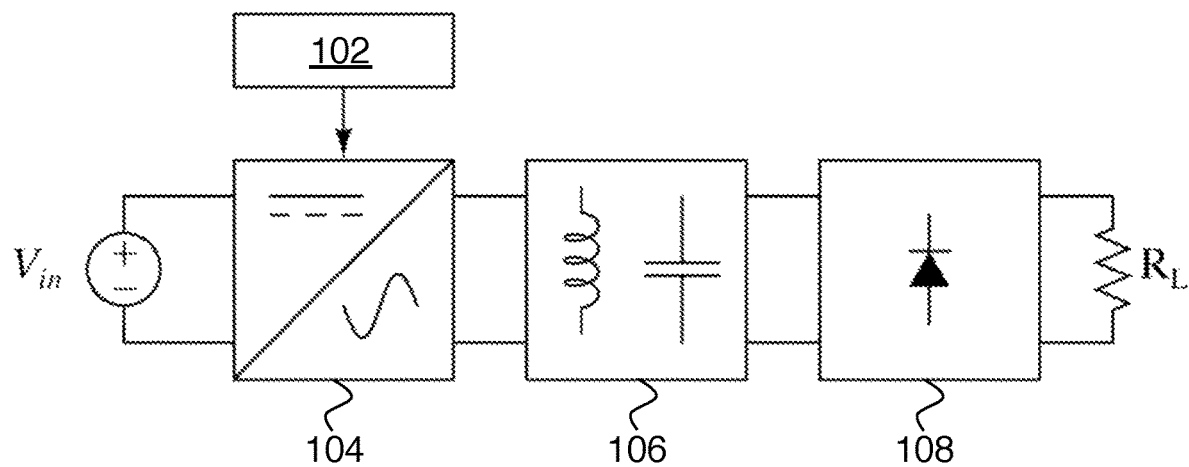
FIG. 1 is a block diagram of a conventional DC-DC converter.

State of the art very high frequency resonant DC-DC converters include at least 3 stages as shown on FIG. 1: an inverter 104, a rectifier 108 and an impedance transformation stage or matching network 106. Here the control circuit for the converter is shown as 102. Inverter 104 is designed to provide AC power efficiently at a specific load and operating frequency $f_{out}$ from a DC input, while the rectifier stage 108, when operating at the rated voltage and power, presents a specific equivalent input load at the operating frequency. Generally the inverter output load and the rectifier input load are not the same and hence the need to include the transformation/matching stage 106. Impedance transformation stage 106 usually includes passive elements connected in a way that an impedance connected to the output port appears as a different value at the input port.

Power is processed/transformed by each of the stages to achieve a desired voltage/current conversion. Parasitics and loss elements in each stage are compounded, which undesirably reduces overall efficiency. Designs with large impedance transformation ratio requirements are difficult to implement and suffer from poor efficiency.

This work provides a way to achieve efficient power conversion while reducing the requirements on the transformation stage, and in many instances without the need of an impedance transformation stage altogether. Specifically, we provide a circuit configuration that isolates the output of a converter electrically from its input terminals. In this way it is possible to connect the outputs of several converters either in series (to achieve larger voltages) or in parallel (to obtain larger currents). The electrical isolation is achieved not through the use of a transformer (as conventionally used) but by using capacitors. The use of capacitors to isolate circuits electrically only becomes feasible at very high frequencies of operation. Thus the operating frequency $f_{out}$ is preferably 1 MHz or more.

Such capacitive isolation achieves two simultaneous requirements: 1) Isolation which allows the interconnection of multiple output loads which in turn provides 2) impedance matching. Optimally, the output loads are so designed such that when connected together, they present the load the inverter was designed for.

Figure 2:
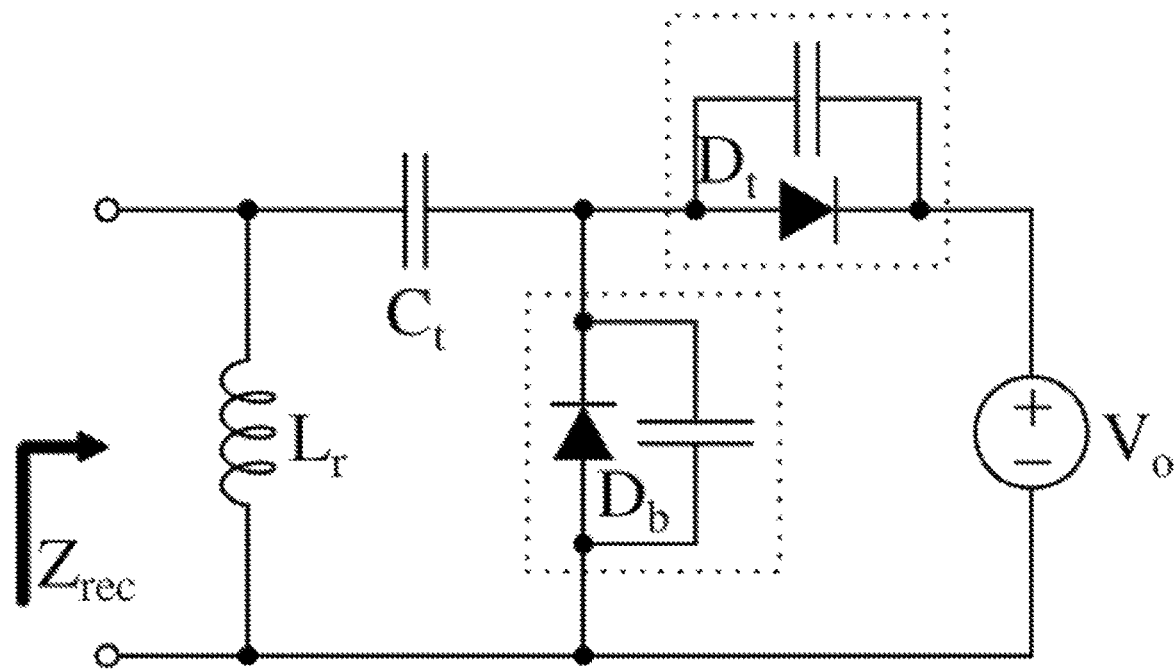
FIG. 2 shows a conventional rectifier stage for use in a DC-DC converter.

FIG. 2 shows an example embodiment of the rectifier block 108 of FIG. 1 used in a proof of concept prototype. Specifically it shows a class DE resonant rectifier connected to a constant output load. Inductor $L_r$ is selected to be resonant with the parasitic capacitances in parallel to the diodes $D_b$ and $D_t$ so as to present an equivalent rectifier impedance $Z_{rec}$ that appears resistive at the fundamental frequency of operation. Capacitor $C_r$ only blocks a DC voltage.

Figure 3:
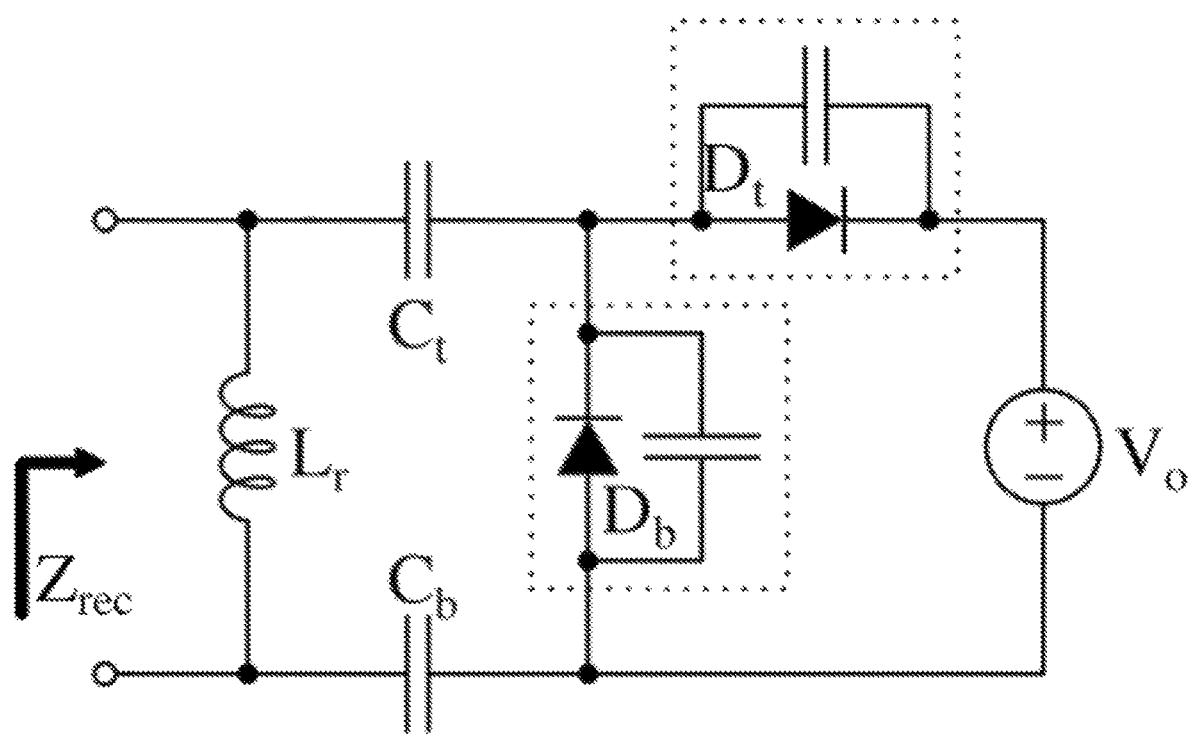
FIG. 3 shows a rectifier stage suitable for use in a DC-DC converter according to embodiments of the invention.

By splitting capacitor $C_t$ of FIG. 2 in two to provide capacitors $C_t$ and $C_b$ as shown on FIG. 3, we can obtain electrical isolation of DC voltage between input and output in the configuration of FIG. 3. The equivalent impedance $Z_{rec}$ is the same as in the previous case in each output circuit.

Each output circuit presents a given equivalent input impedance, so by connecting multiple circuits whose input have a given input impedance, it is possible to combine "n" of the units so that their inputs are either in series or in parallel to obtain an overall input impedance that is either "n" times larger (if inputs are connected in series) or "n" times smaller (if inputs are connected in parallel). This way it is possible to eliminate the matching network.

Figure 4:
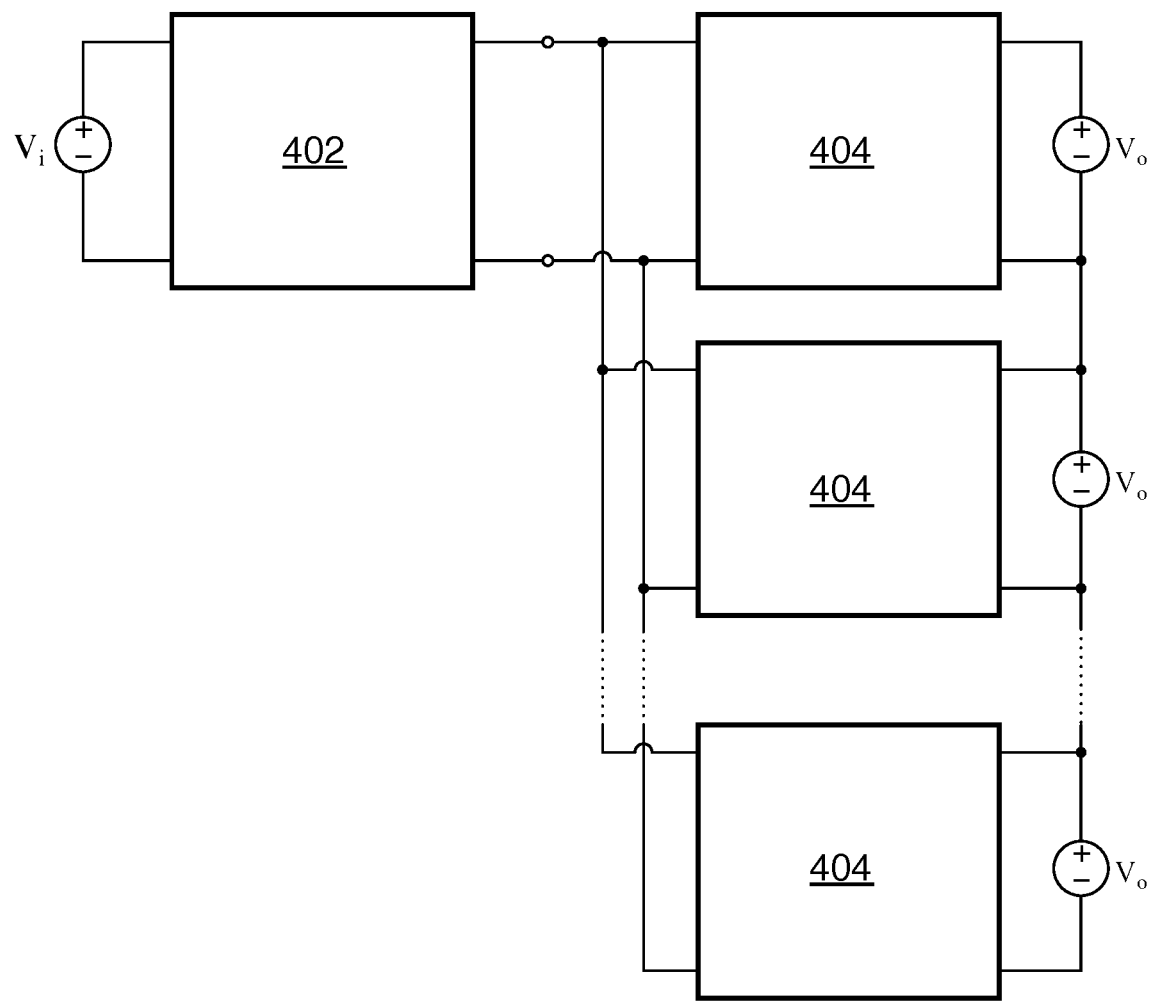
FIG. 4 shows a first embodiment of the invention having several resonant rectifiers connected in parallel to the resonant inverter and having their outputs connected in series.
Figure 5:
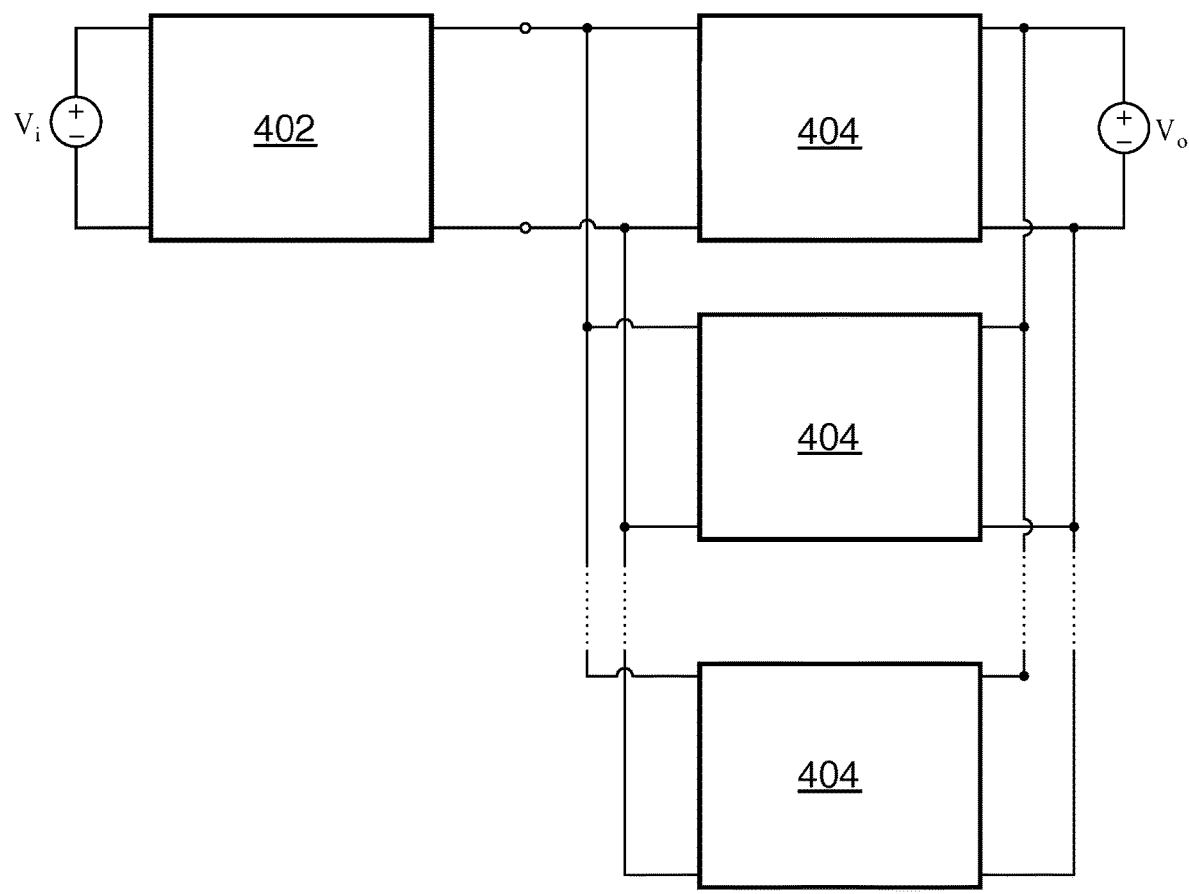
FIG. 5 shows a second embodiment of the invention having several resonant rectifiers connected in parallel to the resonant inverter and having their outputs connected in parallel.

FIG. 4 shows a first embodiment of the invention. In this embodiment, the rectifier stages 404 (each of which includes DC capacitive isolation as described above) are connected to inverter stage 402 in parallel. Let the output impedance of inverter stage 402 be $Z_{out}$, and let the input impedance of each individual rectifier stage 404 be $Z_{in}$. The total impedance $Z_{rec}$ will be $Z_{in}/N$ for N rectifier stages in parallel. Impedance matching in this case is obtained when $Z_{out}=Z_{rec}=Z_{in}/N$. In practice, the impedance matching need not be exact, although it is preferable for the impedance matching to be within about 20% (i.e., $0.8 \leq Z_{rec}/Z_{out} \leq 1.2$ or $0.8 \leq Z_{out}/Z_{rec} \leq 1.2$). In the configuration of FIG. 4, the outputs of the rectifier stages 404 are connected in series, making this configuration suitable for generating high output voltages. The configuration of FIG. 5 is similar to that of FIG. 4, except that the outputs of the rectifier stages are connected in parallel.

Figure 6:
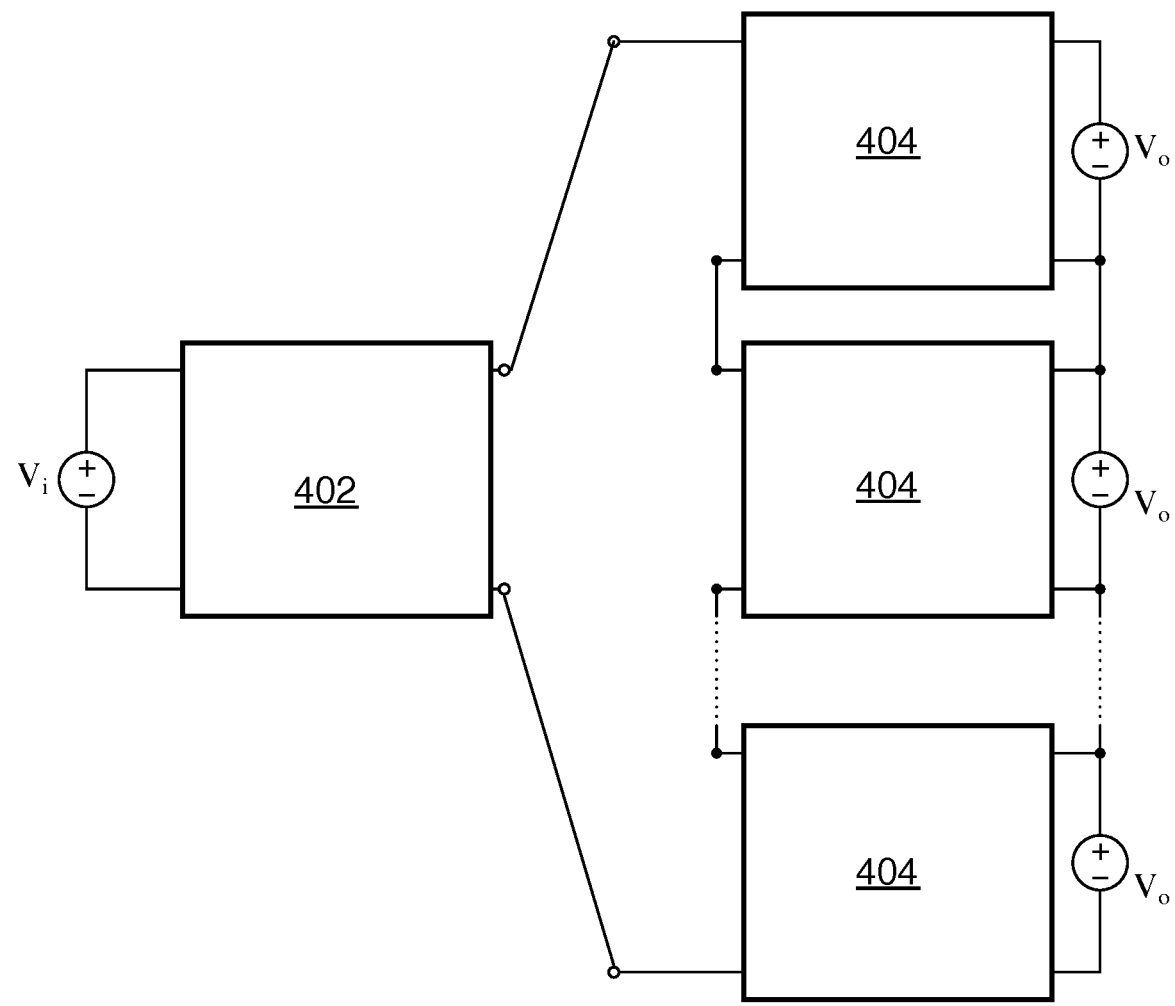
FIG. 6 shows a third embodiment of the invention having several resonant rectifiers connected in series to the resonant inverter and having their outputs connected in series.
Figure 7:
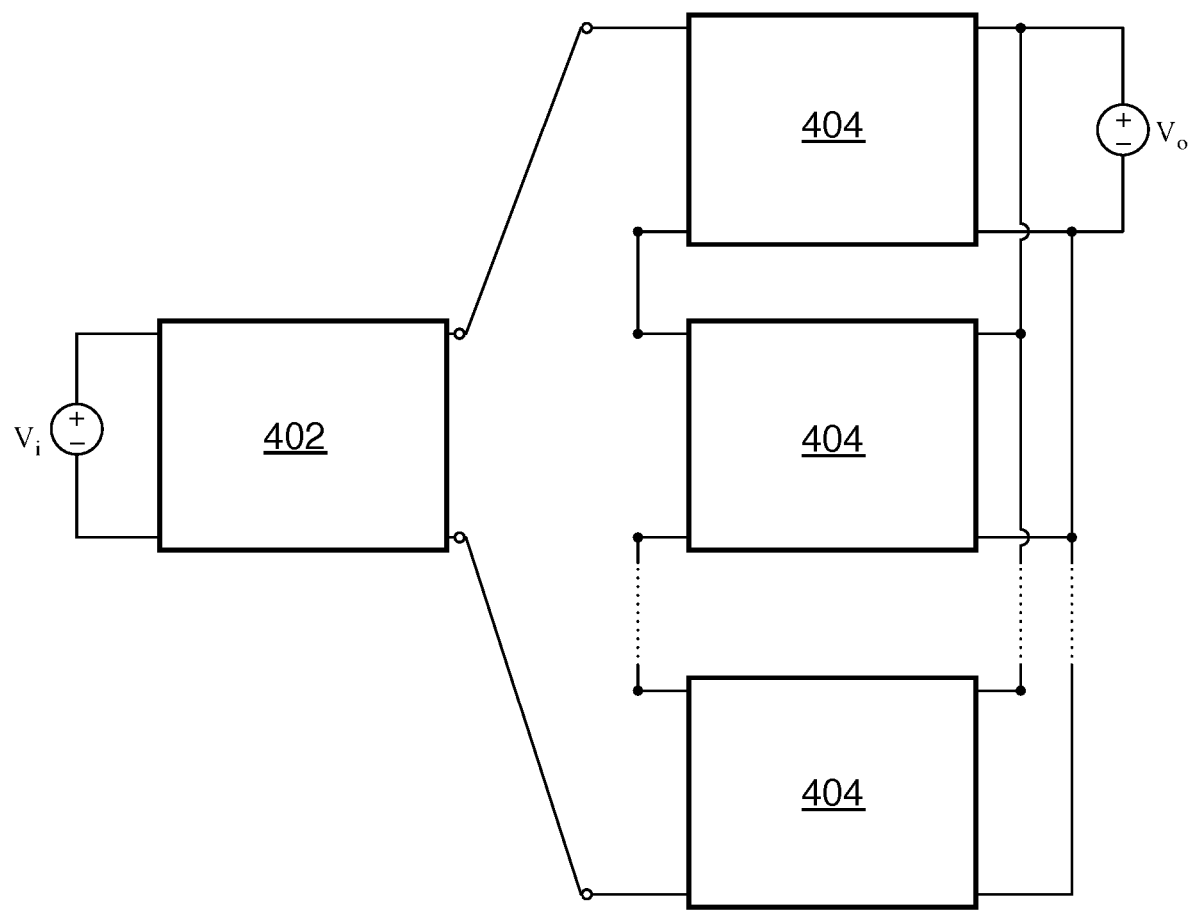
FIG. 7 shows a fourth embodiment of the invention having several resonant rectifiers connected in series to the resonant inverter and having their outputs connected in parallel.

FIG. 6 shows a third embodiment of the invention. In this embodiment, the rectifier stages 404 (each of which includes DC capacitive isolation as described above) are connected to inverter stage 402 in series. Let the output impedance of inverter stage 402 be $Z_{out}$, and let the input impedance of each individual rectifier stage 404 be $Z_{in}$. The total impedance $Z_{rec}$ will be $NZ_{in}$ for N rectifier stages in series. Impedance matching in this case is obtained when $Z_{out}=Z_{rec}=NZ_{in}$. In practice, the impedance matching need not be exact, although it is preferable for the impedance matching to be within about 20% (i.e., $0.8 \leq Z_{rec}/Z_{out} \leq 1.2$ or $0.8 \leq Z_{out}/Z_{rec} \leq 1.2$). In the configuration of FIG. 6, the outputs of the rectifier stages are connected in series, making this configuration suitable for generating high output voltages. The configuration of FIG. 7 is similar to that of FIG. 6, except that the outputs of the rectifier stages are connected in parallel.

Figure 8:
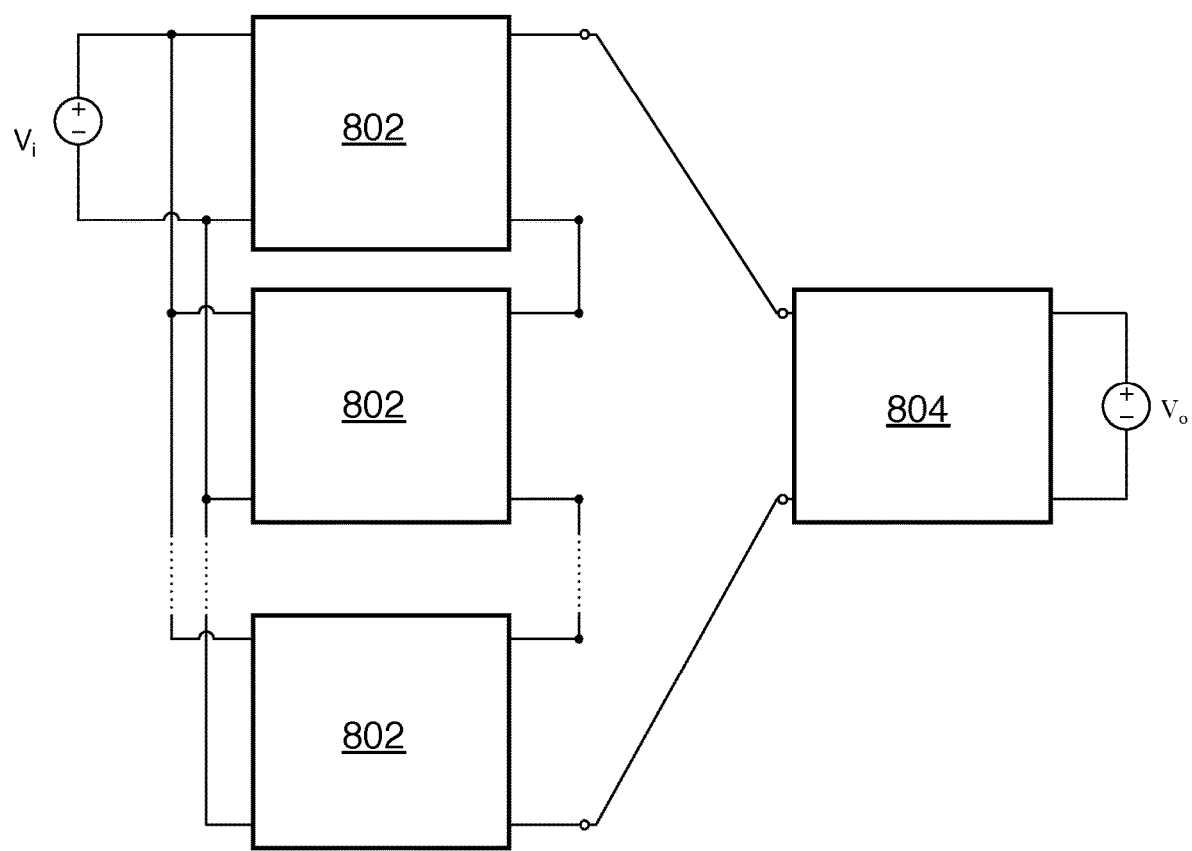
FIG. 8 shows a fifth embodiment of the invention having several resonant inverters connected in series to the resonant rectifier and having their inputs connected in parallel.
Figure 9:
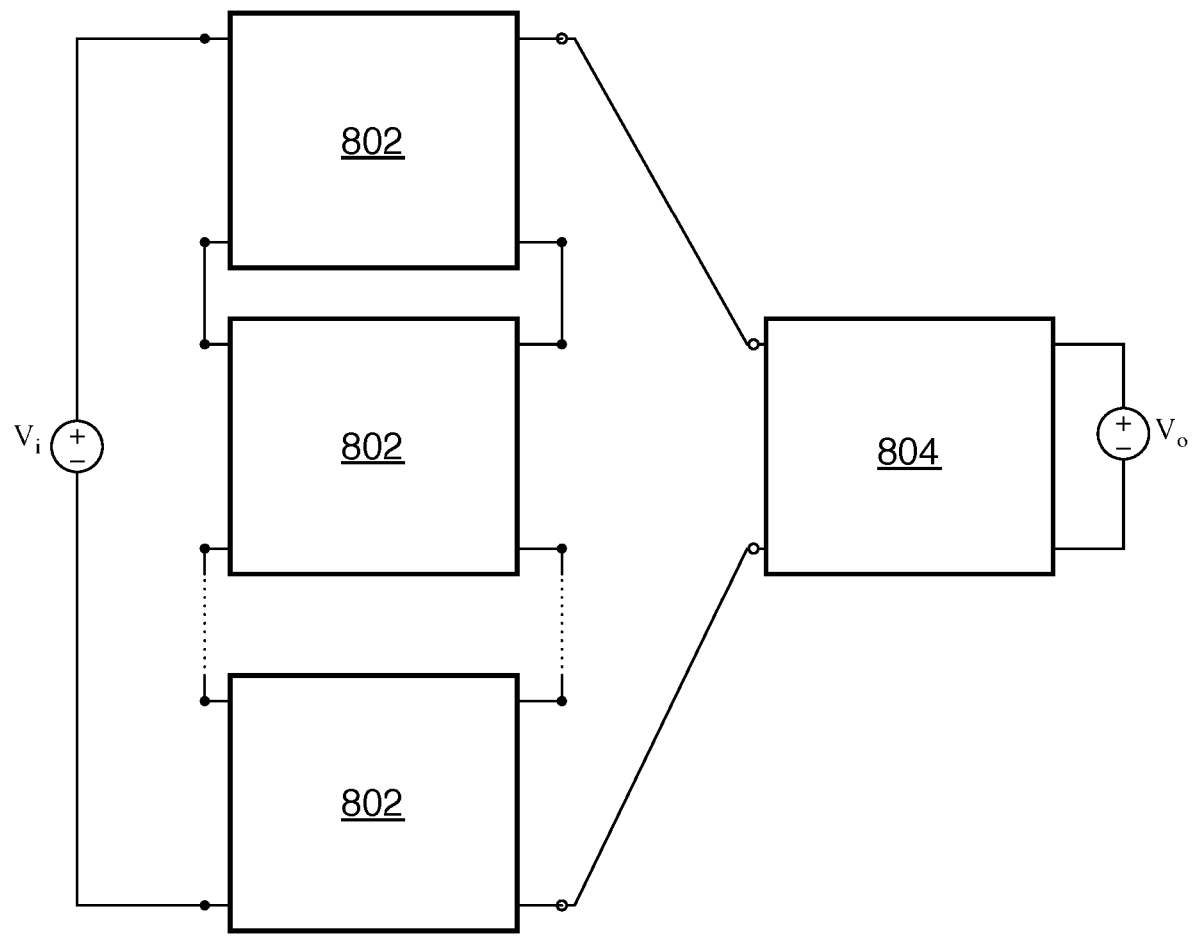
FIG. 9 shows a sixth embodiment of the invention having several resonant inverters connected in series to the resonant rectifier and having their inputs connected in series.

As indicated above, it is also possible to combine several inverter stages with a single rectifier stage to provide impedance matching. FIG. 8 shows a fifth embodiment of the invention according to this principle. In this embodiment, the inverter stages 802 (each of which includes DC capacitive isolation as described above) are connected to rectifier stage 804 in series. Let the input impedance of rectifier stage 804 be $Z_{in}$, and let the output impedance of each individual inverter stage 802 be $Z_{out}$. The total impedance $Z_{rec}$ will be $NZ_{out}$ for N inverter stages in series. Impedance matching in this case is obtained when $NZ_{out}=Z_{rec}=Z_{in}$. In practice, the impedance matching need not be exact, although it is preferable for the impedance matching to be within about 20% (i.e., $0.8 \leq Z_{rec}/Z_{out} \leq 1.2$ or $0.8 \leq Z_{out}/Z_{rec} \leq 1.2$). The configuration of FIG. 9 is similar to that of FIG. 8, except that the inputs of the inverter stages 802 are connected in parallel on FIG. 8 and connected in series on FIG. 9.

Figure 10:
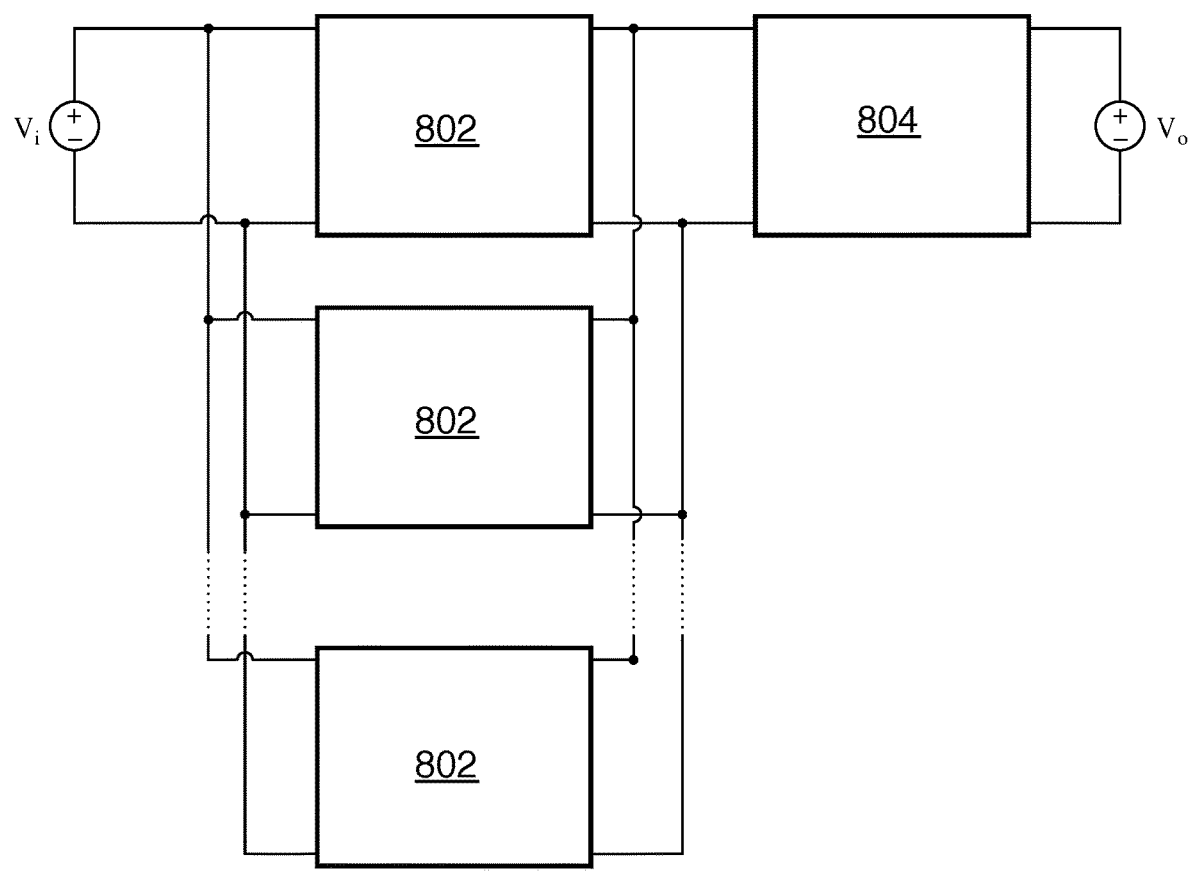
FIG. 10 shows a seventh embodiment of the invention having several resonant inverters connected in parallel to the resonant rectifier and having their inputs connected in parallel.
Figure 11:
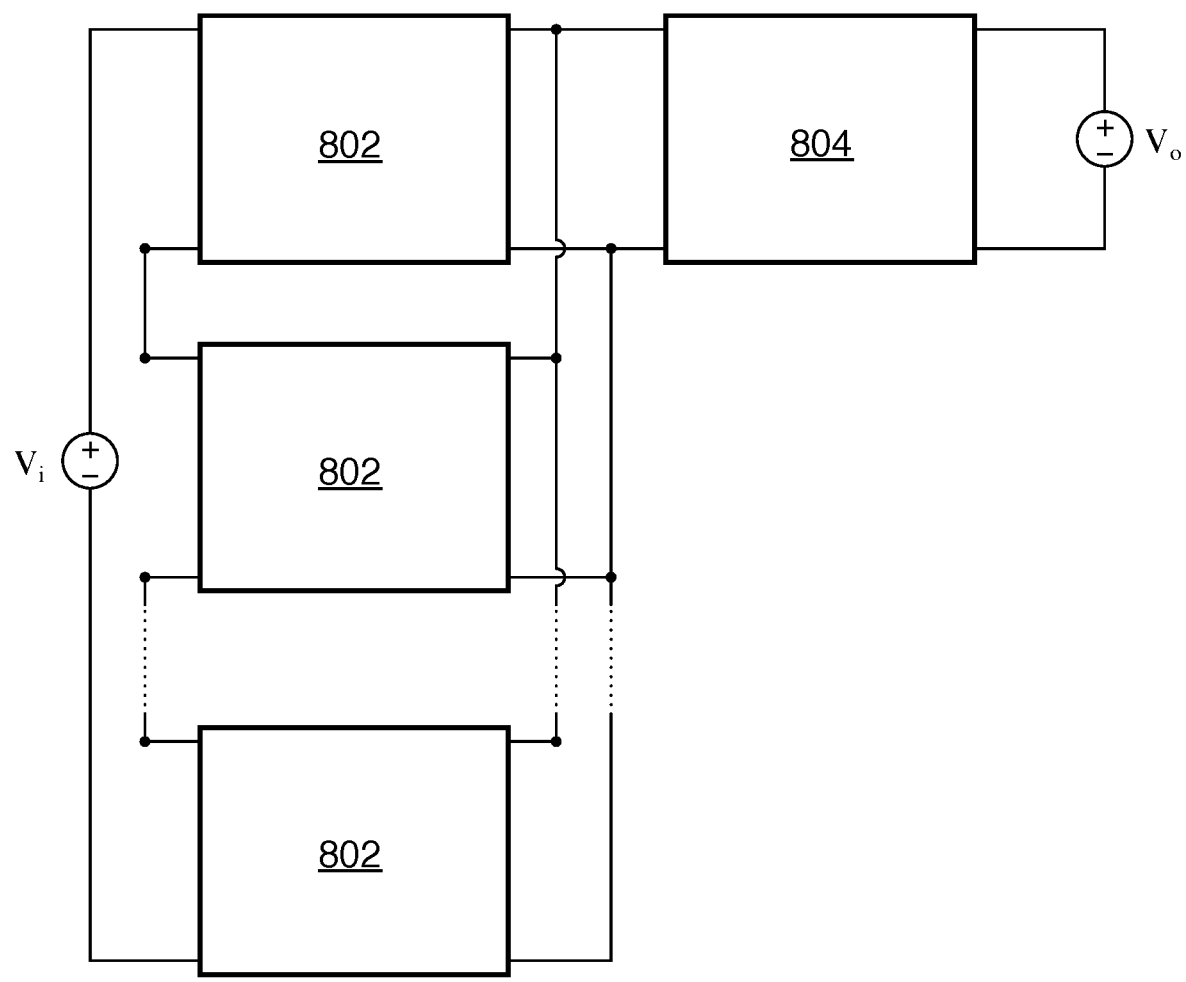
FIG. 11 shows an eighth embodiment of the invention having several resonant inverters connected in parallel to the resonant rectifier and having their inputs connected in series.

FIG. 10 shows a seventh embodiment of the invention. In this embodiment, the inverter stages 802 (each of which includes DC capacitive isolation as described above) are connected to rectifier stage 804 in parallel. Let the input impedance of rectifier stage 804 be $Z_{in}$, and let the output impedance of each individual inverter stage 802 be $Z_{out}$. The total impedance $Z_{rec}$ will be $Z_{out}/N$ for N inverter stages in parallel. Impedance matching in this case is obtained when $Z_{out}/N=Z_{rec}=Z_{in}$. In practice, the impedance matching need not be exact, although it is preferable for the impedance matching to be within about 20% (i.e., $0.8 \leq Z_{rec}/Z_{out} \leq 1.2$ or $0.8 \leq Z_{out}/Z_{rec} \leq 1.2$). The configuration of FIG. 11 is similar to that of FIG. 10, except that the inputs of the inverter stages 802 are connected in parallel on FIG. 10 and connected in series on FIG. 11.

This approach provides multiple advantages: 1) Higher efficiency: Power is processed twice, and not three times resulting in higher efficiency; 2) High voltage conversion ratios: Because the outputs of the rectifier circuit is electrically isolated, multiple converters can be connected in series or in parallel to achieve large conversion ratios; and 3) Better performance: In one embodiment of the invention, we can achieve much higher voltages while using low voltage semiconductors. Lower voltage semiconductors have much lower losses than higher voltage counterparts.

This approach overcomes many obstacles preventing high frequency implementations reaching high gains and output voltages: 1) Transformers are difficult to implement at high frequencies and tend to be lossy, 2) Semiconductor device breakdown provides a definite ceiling for output voltages in traditional single stage topologies, 3) Cost and performance issues associated with wide bandgap semiconductors, 4) Gain tends to be limited by the ability to match the inverter stage to the rectifier.

Figure 12:
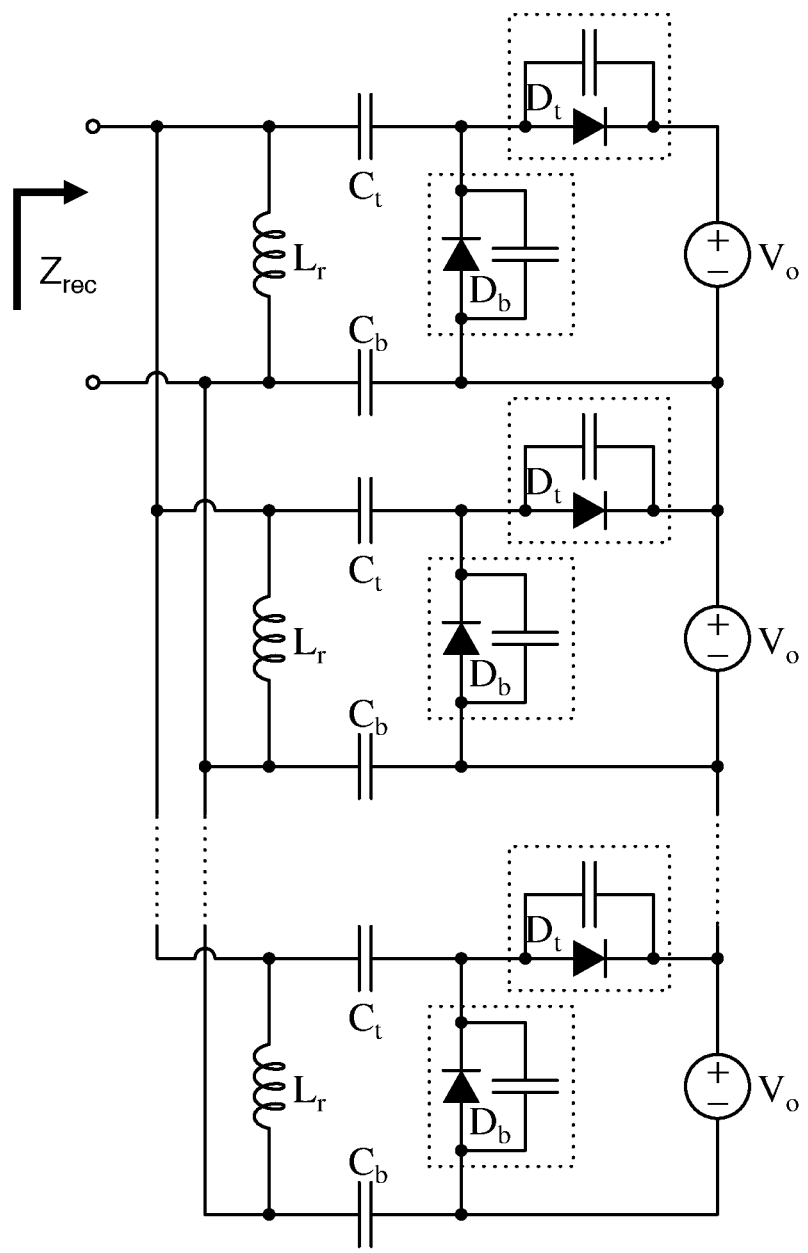
FIG. 12 shows a first tested circuit configuration.
Figure 13:
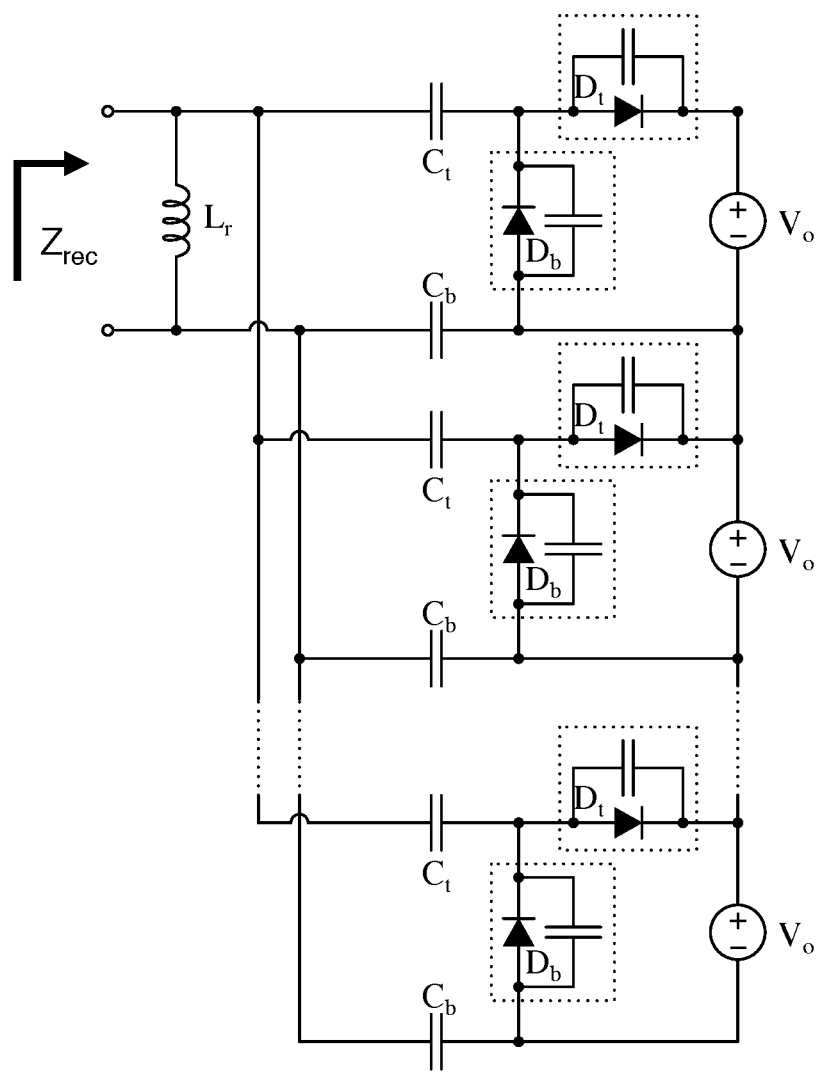
FIG. 13 shows a second tested circuit configuration.

Several design examples of this approach have been investigated. More specifically, a 100 W, 2000 Vdc converter operating at a switching frequency of 27.12 MHz with an input voltage 100 V has been demonstrated. Impedance matching in this circuit was provided by a parallel combination of 12 identical rectifier stages as described above, without the use of an impedance matching network or transformer. 87% efficiency has been achieved in this experiment. FIG. 12 and FIG. 13 show two of the combinations of rectifier circuits that were tested. Note that because the resonant inductors of the class DE rectifier are in parallel in FIG. 12, their inductors can be combined into a single inductor of value n times smaller, as shown in FIG. 13.

It is important to note that the output impedance $Z_{out}$ of the power inverter(s) and/or the input impedance $Z_{in}$ of the resonant rectifier(s) can be set to desirable values by use of circuit components within the power inverter(s) and resonant rectifier(s). Such control of impedance can facilitate the 1:N impedance matching of a single inverter to multiple rectifiers by series or parallel connections. It can also be used to facilitate the N:1 impedance matching of multiple inverters to a single rectifier by series or parallel connections. For example, if a 1:3 topology is desired (e.g., to provide a suitable output from the combined rectifiers), then it is preferred to adjust the inverter $Z_{out}$ and/or rectifier $Z_{in}$ such that impedance matching can be accomplished by series (i.e., $Z_{out}=3Z_{in}$) or parallel (i.e., $Z_{out}=Z_{in}/3$) connections as described above.

The preceding examples and embodiments relate to 1:N and N:1 circuit topologies. The above described principles can also be extended to N:M circuit topologies. For example, N resonant inverters can be connected to M resonant rectifiers such that impedance matching of each of the resonant inverters to the M resonant rectifiers is as described above. Alternatively, impedance matching of each of the resonant rectifiers to the N resonant inverters can be as described above.

The invention claimed is:

1. A DC to DC electric power converter comprising:
a resonant power inverter configured to receive a DC input and to provide an AC output having a frequency $f_{out}$, wherein an output impedance of the power inverter is $Z_{out}$;

two or more (N) resonant rectifier circuits directly connected to the AC output provided by the power inverter, wherein the resonant rectifier circuits are tuned to operate resonantly at $f_{out}$, and wherein the resonant rectifier circuits are each configured to receive the AC output and to provide a DC output and each of the resonant rectifier circuits include capacitors coupled between the AC output provided by the power inverter and the DC output provided by the resonant rectifiers circuits, wherein each of the N resonant rectifier circuits has an input impedance of $Z_{in}$ at $f_{out}$ and wherein N is an integer greater than 1;

wherein electrical isolation between the DC input and the DC outputs is provided exclusively with the capacitors of the two or more resonant rectifier circuits; and wherein impedance matching, for $Z_{out}$ of the power inverter and a total impedance of the N resonant rectifier circuits, is provided either by parallel connections of the resonant rectifier circuits to the power inverter or by series connections of the resonant rectifier circuits to the power inverter, wherein $Z_{out}$ is related to the total impedance of the N resonant rectifier circuits by a factor of N.

2. The DC to DC electric power converter of claim 1, wherein if the N resonant rectifier circuits are connected to the power inverter by the parallel connections, the AC output from the resonant power inverter is to be provided to each of the N resonant rectifier circuits at a common node, and wherein if the N resonant rectifier circuits are connected to the power inverter by the series connections, the AC output from the resonant power inverter is to be provided to a first one of the N resonant rectifier circuits, with an output of the first one of the N resonant rectifier circuits being connected to an input of a second one of the N resonant rectifier circuits.

3. The DC to DC electric power converter of claim 1, wherein the N resonant rectifier circuits are connected to the power inverter in parallel, and wherein $Z_{out}$ is about $Z_{in}/N$.

4. The DC to DC electric power converter of claim 1, wherein the N resonant rectifier circuits are connected to the power inverter in series, and wherein $Z_{out}$ is about N times $Z_{in}$.

5. The DC to DC electric power converter of claim 1, wherein the impedance matching is within about 20%.

6. The DC to DC electric power converter of claim 1, wherein $f_{out}$ is greater than 1 MHz.

7. The DC to DC electric power converter of claim 1, wherein the N resonant rectifier circuits are connected to the power inverter by the parallel connections and the AC output from the resonant power inverter is to be provided to each of the resonant rectifier circuits at a common node.

8. The DC to DC electric power converter of claim 1, wherein the N resonant rectifier circuits are connected to the power inverter by the series connections, and the AC output from the resonant power inverter is to be provided to a first one of the N resonant rectifier circuits, with an output of the first one of the N resonant rectifier circuits being connected to an input of a second one of the N resonant rectifier circuits.

9. The DC to DC electric power converter of claim 1, wherein the N resonant rectifier circuits are connected to the power inverter by the series connections, with an output of the first one of the N resonant rectifier circuits being connected to an input of a second one of the N resonant rectifier circuits and with the output of the second one of the N resonant rectifier circuits being of a magnitude greater than the output of the first one of the N resonant rectifier circuits due to the series connections.

10. The DC to DC electric power converter of claim 1, wherein each of the N resonant rectifier circuits is to contribute to the impedance matching to a degree that is about equal.

11. A DC to DC electric power converter comprising:
two or more ("N") resonant power inverters configured to receive a DC input and to provide respective AC outputs having a frequency $f_{out}$;
a resonant rectifier circuit directly connected to the AC outputs provided by the N resonant power inverters, wherein the resonant rectifier circuit is tuned to operate resonantly at $f_{out}$, wherein the resonant rectifier circuit is configured to receive the AC outputs and to provide a DC output, and wherein an input impedance of the resonant rectifier circuit is $Z_{in}$;
wherein electrical isolation between the DC inputs and the DC output is provided exclusively with capacitors of the resonant rectifier circuit; and
wherein impedance matching, for a total impedance of the N resonant power inverters and the resonant rectifier circuit, is provided either by parallel connections of the N resonant power inverters to the rectifier circuit or by series connections of the resonant power inverters to the rectifier circuit, wherein $Z_{in}$ is related to the total impedance of the N resonant power inverters by a factor of N.

12. The DC to DC electric power converter of claim 11, wherein each of the N resonant power inverters has an output impedance at $f_{out}$ of $Z_{out}$.

13. The DC to DC electric power converter of claim 12, wherein the N resonant power inverters are connected to the rectifier circuit in parallel, and wherein $Z_{out}/N$ is about $Z_{in}$.

14. The DC to DC electric power converter of claim 12, wherein the N resonant power inverters are connected to the rectifier circuit in series, and wherein N times $Z_{out}$ is about $Z_{in}$.

15. The DC to DC electric power converter of claim 11, wherein the impedance matching is within about 20%.

16. The DC to DC electric power converter of claim 11, wherein $f_{out}$ is greater than 1 MHz.

17. The DC to DC electric power converter of claim 11, wherein each of the N resonant power inverters are connected to the resonant rectifier circuit by the parallel connections, and the AC outputs from the N resonant power inverters are to be connected at a common node for driving the resonant rectifier circuit.

18. The DC to DC electric power converter of claim 11, wherein the N resonant power inverters are connected by the series connections, and the N resonant power inverters are connected in a cascaded manner for their respective AC outputs to drive the resonant rectifier circuit, with an output of the first one of the N resonant power inverters being connected to an input of a second one of the N resonant power inverters.

19. The DC to DC electric power converter of claim 11, wherein the N resonant power inverters are connected by the series connections with each successively-connected one of the N resonant power inverters providing an increased level in its respective AC output.

20. The DC to DC electric power converter of claim 11, wherein each of the N resonant power inverters is to contribute to the impedance matching to a degree that is about equal.

* * * * *